(12) United States Patent
Bradley

(10) Patent No.: US 6,687,716 B1
(45) Date of Patent: *Feb. 3, 2004

(54) FILE CONSISTENCY PROTOCOLS AND METHODS FOR CARRYING OUT THE PROTOCOLS

(75) Inventor: Mark W. Bradley, Boulder, CO (US)

(73) Assignee: Radiant Data Corporation, Niwot, CO (US)

(*) Notice: Subject to any disclaimer, the term of this patent is extended or adjusted under 35 U.S.C. 154(b) by 184 days.

This patent is subject to a terminal disclaimer.

(21) Appl. No.: 09/662,368

(22) Filed: Sep. 13, 2000

(51) Int. Cl.[7] .................................................. G06F 12/00
(52) U.S. Cl. ................................................. 707/201; 707/8
(58) Field of Search ............................. 707/201, 8, 200, 707/203; 709/213

(56) References Cited

U.S. PATENT DOCUMENTS

| | | | | |
|---|---|---|---|---|
| 4,394,731 A | * | 7/1983 | Flusche et al. | 711/121 |
| 4,604,694 A | * | 8/1986 | Hough | 710/200 |
| 4,775,955 A | * | 10/1988 | Liu | 711/135 |
| 5,220,657 A | * | 6/1993 | Bly et al. | 345/751 |
| 5,293,600 A | * | 3/1994 | Vriezen | 707/8 |
| 5,517,648 A | * | 5/1996 | Bertone et al. | 710/244 |
| 5,557,674 A | * | 9/1996 | Yeow | 713/165 |
| 5,828,876 A | * | 10/1998 | Fish et al. | 707/1 |
| 5,909,540 A | * | 6/1999 | Carter et al. | 714/4 |
| 5,940,838 A | * | 8/1999 | Schmuck et al. | 707/200 |
| 5,999,930 A | * | 12/1999 | Wolff | 707/10 |

* cited by examiner

Primary Examiner—Safet Metjahic
Assistant Examiner—Brian Goddard
(74) Attorney, Agent, or Firm—Martine & Penilla, LLP

(57) ABSTRACT

Methods for maintaining consistent data and attributes for files sharable by two or more consumers are provided. One exemplary method includes initially defining a set of consistency bits that are implemented by a file consistency protocol. Once the consistency bits are defined and implemented by a file system managing the shared files, the method receives indication that a change was made to a file associated with the file system. The method then sets a bit of the set of consistency bits on each instance file to reflect the change performed to the file. An update is then messaged to each instance file such that the instance files contain the change made to the file. The messaging can be performed by way of a pulling protocol or a push protocol, which transfers the updates to the instances to maintain the consistency.

45 Claims, 6 Drawing Sheets

| ACTION | REQUIRED BIT SETTING |
|---|---|
| List | No bit changes |
| Open Shared | Set S bit |
| Open Exclusive | Set E bit to all, including the copy in use |
| Write | Set M to written copy, set I in all other copies |
| Change Attributes | Set A and M to changed copy, set A and I in all other copies |
| Close | Reset any set consistency bits |
FIG. 1B
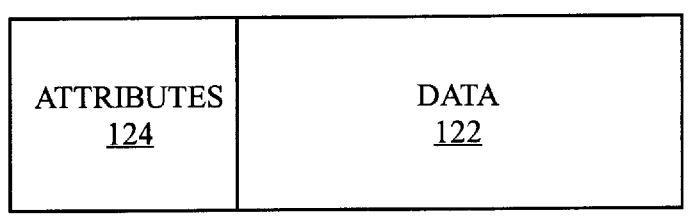
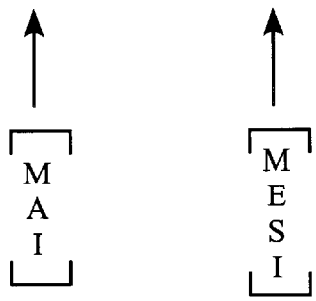
FIG. 1H

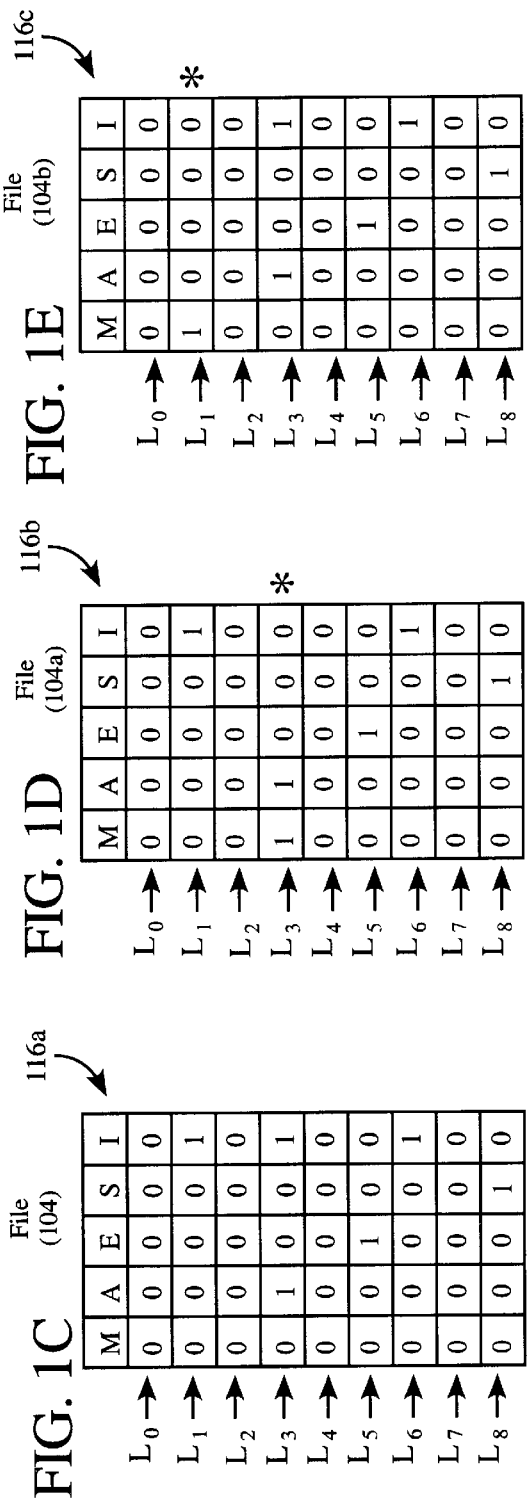
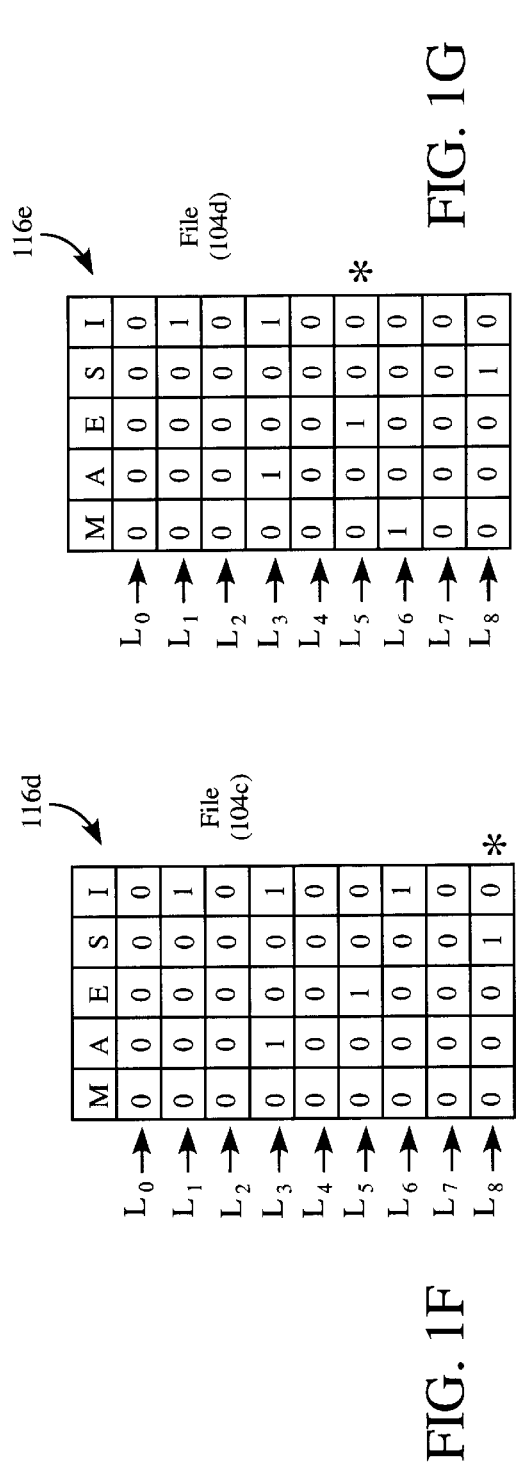
FIG. 1C  FIG. 1D  FIG. 1E  FIG. 1F  FIG. 1G

FILE CONSISTENCY PROTOCOLS AND METHODS FOR CARRYING OUT THE PROTOCOLS

CROSS REFERENCE TO RELATED APPLICATIONS

This application is related to U.S. Patent Application entitled "METHODS FOR MAINTAINING DATA AND ATTRIBUTE COHERENCY IN INSTANCES OF SHARABLE FILES," having U.S. patent application No. 09/661,227, filed on the same day as the instant application, and U.S. Patent Application entitled "PROTOCOLS FOR LOCKING SHARABLE FILES AND METHODS FOR CARRYING OUT THE PROTOCOLS," having U.S. patent application No. 09/661,114, filed on the same day as the instant application. Each of these U.S. Patent Applications is hereby incorporated by reference.

BACKGROUND OF THE INVENTION

1. Field of the Invention

This invention relates generally to the management of sharable files, and more particularly to a file consistency protocol for maintaining consistency among sharable files.

2. Description of the Related Art

In today's computing environment computers are increasingly used in a networked environment. As an example, a majority of workplace users are connected to an internal network or system where each user works from a station, such as computer, connected to a server or servers that are part of the network. Each user's computer contains various applications that operate on files which are stored on the server or on their own station, which may offer analogous services. Therefore, a first user may access the server or analogous device to use a file by way of an application on the first user's machine. In addition, a second user may also access the same file and use the contents of the file with an application on the second user's machine. Nonetheless, the situation arises in this shared environment where the first user changes data in the file which is also being used by the second user. As such, file consistency is necessary to ensure that all copies or instances of the file in use contain the same information as updates are performed to each instance of the file.

Currently, the methods available to maintain file consistency among multiple copies of a file include making an independent copy of the file and then manually or explicitly programmatically merging the changes back into the original file; a UNIX type file consistency scheme where an original file is locked after changes are made to a copy; and a distributed file system approach. Each of these prior art techniques will now be discussed in more detail.

As mentioned above, one method of ensuring file consistency requires that an independent copy of the file with a different file name be made. When the user writes changes to with the independent copy, the user must manually integrate the changes made to the independent copy back into the original file, which may be stored on a server. Of course, the changes cannot be merged back into the file while the original copy is in use by another user. As can be appreciated, integrating the changes between files requires significant effort on the part of the users accessing the file, decreases efficiency, and increases the amount of disc space necessary to store the various file copies. Furthermore, when the user makes an independent copy, the independent copy is required to be saved under a different file name (or in a different place, e.g., directory, disk, system, etc). Thus, a subsequent user may not know the new file name or location of the independent copy and may inadvertently access an outdated, invalid copy.

The UNIX operating system also has a method for maintaining file consistency among different copies of files accessible by many users. If multiple copies of a file are being accessed by different users, the UNIX operating system, or applications using the UNIX file system may automatically lock the file so that all users are prevented from saving changes to the file. In order to save changes, the UNIX operating system, file system, or application will also require the user to save the changes to an independent file having a different filename, thereby creating a copy. Thus, a user must wait until all others using the file have closed the file (i.e., making the file no longer shared), or the user must save the file under a different name, which is undesirable for the previously mentioned reasons.

In addition, UNIX allows a user to change the file attributes of the file such that the file is writable by everyone at all times and copies of the file containing different data exist on the UNIX system. As a result, when a file is writable, any modifications made by a first user are independent from other modifications made by a second user. Therefore, the modifications made by the first user do not appear on the copy in use by the second user. By the same token, any modifications made by the second user do not appear on the copy of the file being used by the first user. Thus, all the changes made by individual users are saved to individual copies and are not saved to the original file. Consequently, the original file, and copies of the original file, do not contain the modifications made by both the first and second, etc. users.

As also mentioned, another approach used to facilitate data consistency of a shared file is to use a distributed file system. Under this approach, the distributed file system distributes file data over multiple computers thereby allowing the data to reside at multiple locations simultaneously. With this approach, a user A may have a file A stored on a hard drive of user A's computer. If a user B wants to access the file on user A's computer, the distributed file system copies the file A to user B's memory or hard drive. In this situation, when user B is accessing the file A, a flag is set in the file A which informs the distributed file system that the user B is making changes to the file A. The flag enables the locking of the file A such that when user A attempts to use the file A in a manner that conflicts with user B's usage (i.e., changing the data in the file A), this setting prevents user A from changing the data. When the user B closes the file A, and the user A attempts to write to the file A, the distributed file system informs the user A that changes have been made and the distributed file system will ask the user A if the user A wants a copy of the file A containing the changes. However, this scheme is inefficient because the distributed file system must track who is modifying the file and the distributed file system must ask individual users, such as user A, when they are trying to access the file A, if the user A wants a fresh copy of the file A containing the changes. Additionally, the inefficiency is further compounded since the distributed file system must provide each user with a new copy in each instance when a separate user attempts access to the file. Furthermore, the distributed file system is not always capable of globally providing a new copy of the file containing the changes to all users which, in some situations, may number hundreds of users. In summary, under the distributed file system approach, the user A and the user B may not simultaneously write to the file A. Instead, if the user A is working with the file A in an exclusive manner, the user B must wait for user A to close the file A before user B may access file A. The file A can still be opened, however, the file will be read-only (i.e., no writing is allowed), and its contents are not guaranteed to be valid/current.

An example of a distributed file system is an Andrew file system. The Andrew file system allows a user to share files over a network and a subsystem. However, the Andrew file system requires an undesirable amount of overhead, such as CPU cycling time and increased network traffic. In addition, overhead is further increased due to the increased amount of user intervention involved with the Andrew file system. The Andrew file system requires user applications to communicate with one another before certain actions, such as data modifications, are commenced. Therefore, as the number of shared users on the network using the Andrew file system increases, the complexity of operating an Andrew file system increases.

Another problem with shared environment platforms where users access files on a shared storage medium relates to file locking and file sharing. An example of the current locking/sharing mechanisms available are a revision control system (RCS) and a source code control system (SCCS). With these approaches, a user C can open a file C in a shared mode and a user D may also access the file C. However, when the file C is opened in the shared mode, neither user may ever modify existing data in the file C or add data to the file C. Therefore, the file C (i.e., while in shared use) becomes a read-only file with the current locking/sharing mechanisms.

As may be seen, none of the prior art techniques previously described enable a real time sharing environment where multiple users may simultaneously read the same file and write to the same file.

In view of the foregoing, there is a need for methods that enable users to simultaneously open files and work with those open files at the same time. These methods should also enable other instances of a file to be updated with modifications to maintain consistency among file copies with minimal overhead and without prior knowledge by user, application or file system.

SUMMARY OF THE INVENTION

Broadly speaking, the present invention fills the aforementioned needs by providing methods for maintaining file consistency among instances (i.e., sharable copies) of a file. A file is broadly defined to include, for example, a data file, a disk volume, directory, a special file (e.g., such as a UNIX device node), etc. It should be appreciated that the present invention can be implemented in numerous ways, including as a process, an apparatus, a system, a device, a method, or a computer readable media. Several embodiments of the present invention are described below.

In one embodiment, a method for maintaining consistent file data for shared files is disclosed. The method includes defining a set of consistency bits. Once the consistency bits are defined and implemented by a file system managing the shared files, the method includes changing a file associated with the file system. The method then sets a bit of the set of consistency bits on an instance file to reflect that a change was performed to the file. An update representing the bit change(s) is then communicated to the instance file such that the instance file software is notified of the change made to the file. The appropriate action is then taken to update other files to match the instance of the file which was modified. The data transfer can be performed by way of a pulling protocol or a push protocol, which transfers the updates to one or more instances to maintain consistency for the shared file.

In another embodiment, a method for maintaining file consistency between file data associated with a file managed by a file system is disclosed. The method includes integrating a file consistency protocol with an operating system (O/S). The file consistency protocol maintains file consistency of copies of the file associated with the file system with a set of consistency bits. As attributes of the file or data within the file are changed, a bit within the set of consistency bits is set on a instance file to reflect the change performed to the file attributes. The change is made in accordance with the file consistency protocol that operates based on the settings of the set of consistency bits. After the changes are made to the file, the instance file is updated using the file consistency protocol such that the instance file obtains the change made to the file.

In yet another embodiment, a method for maintaining file consistency between multiple copies of a file is disclosed. The method includes associating a file consistency protocol with an operating system (O/S). The file consistency protocol maintaining file consistency between the multiple copies of the file associated with a file system using a set of file consistency protocol bits. The method further includes performing an action on the file to change the file and determining the type of action performed on the file. A bit in the set of file consistency protocol bits in the multiple copies of the file is set such that the set bits reflect the action performed on the file. The method then proceeds to communicate an update to the multiple copies of the file having the set bit such that the multiple copies of the file contain the change performed on the file.

In still another embodiment, a method for maintaining file consistency between multiple copies of a file is disclosed. The method includes integrating a set of file consistency protocol bits to a file system that manages the file and the multiple copies of the file. An action is then performed on the file to change the file. The method sets a bit in the set of file consistency protocol bits in the multiple copies of the file such that the set bits reflect the action performed on the file. An update is communicated to the multiple copies of the file having the set bit such that the multiple copies of the file contain the change performed on the file.

In a further embodiment of the present invention, a file consistency protocol, which is integrated with an operating system, maintains file consistency of files managed by a file system. The file consistency protocol includes a set of file consistency bits that correspond to actions performed on a file managed by the file system. The set of file consistency bits are configured to be set when one of the actions is performed on the file. Furthermore, the file consistency protocol includes a plurality of instances of the file where the set of file consistency bits are set for each of the plurality of instances of the file such that each of the instances are updated when the actions change the file.

The advantages of the present invention are numerous. Most notably, embodiments of the present invention enable consistency of file content between shared files (e.g., file instances) being managed by a file system. Thus, when multiple copies of a file are in use and one of the multiple copies are changed, the file consistency protocol ensures that the other multiple copies of the file will also be updated (in accordance with a defined bit map code) when one of the multiple copies is changed. In addition, the present invention allows for an open shared mode to enable multiple users to view copies of the file simultaneously, while at the same time ensuring that consistency is maintained as changes are made by users of instances of the shared file.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 1B is a table illustrating the various functions of a file consistency protocol in accordance with one embodiment of the present invention.

FIG. 1C shows a bit map for a copy of a file associated with a file system, in accordance with one embodiment of the present invention.

FIG. 1D shows a bit map for a copy of a file associated with a file system, in accordance with one embodiment of the present invention.

FIG. 1E shows a bit map for a copy of a file associated with a file system, in accordance with one embodiment of the present invention.

FIG. 1F shows a bit map for a copy of a file associated with a file system, in accordance with one embodiment of the present invention.

FIG. 1G shows a bit map for a copy of a file associated with a file system, in accordance with one embodiment of the present invention.

FIG. 1H shows a file header for files in accordance with one embodiment of the present invention.

DETAILED DESCRIPTION OF THE PREFERRED EMBODIMENTS

An invention for methods of maintaining consistency between files managed by a file system are disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

As an overview, the embodiments of the present invention enable file consistency among sharable files associated with a system, such as a network or other J,O transport (e.g., PCI). The network can be of any type, for example, the network can be a local area network (LAN), a wide area network (WAN), a local storage network, a distributed storage network, a storage area network (SAN), Intranets, as well as the Internet. As used herein, file consistency refers to maintaining consistent data and consistent attributes among various copies (or instances) of the same file being used by various users on the system. In the system, various users may be using copies of the same file at any given time. As a user works with a file, the user may modify (e.g., delete, add, or change) data to the file or change the attributes of the file. When the user makes a change to a file, either an attribute change or a data change, the embodiments of the present invention ensure that all copies of the file on the system are updated to reflect the changes made by the user, thereby maintaining consistency among the copies or instances of the file.

The present invention achieves file consistency with a file consistency protocol. The file consistency protocol implements a set of bits, which in one embodiment include "NM", "A", "E", "S" and "I" bits. As will be discussed in much greater detail with reference to accompanying Figures, the "M", "A", "E", "S" and "I" bits define different modes and different actions which may be performed on the file. Thus, the file consistency protocol is used during shared use and to appropriately update the copies of the file as changes are made to an individual copy of the file.

Figure 1A:
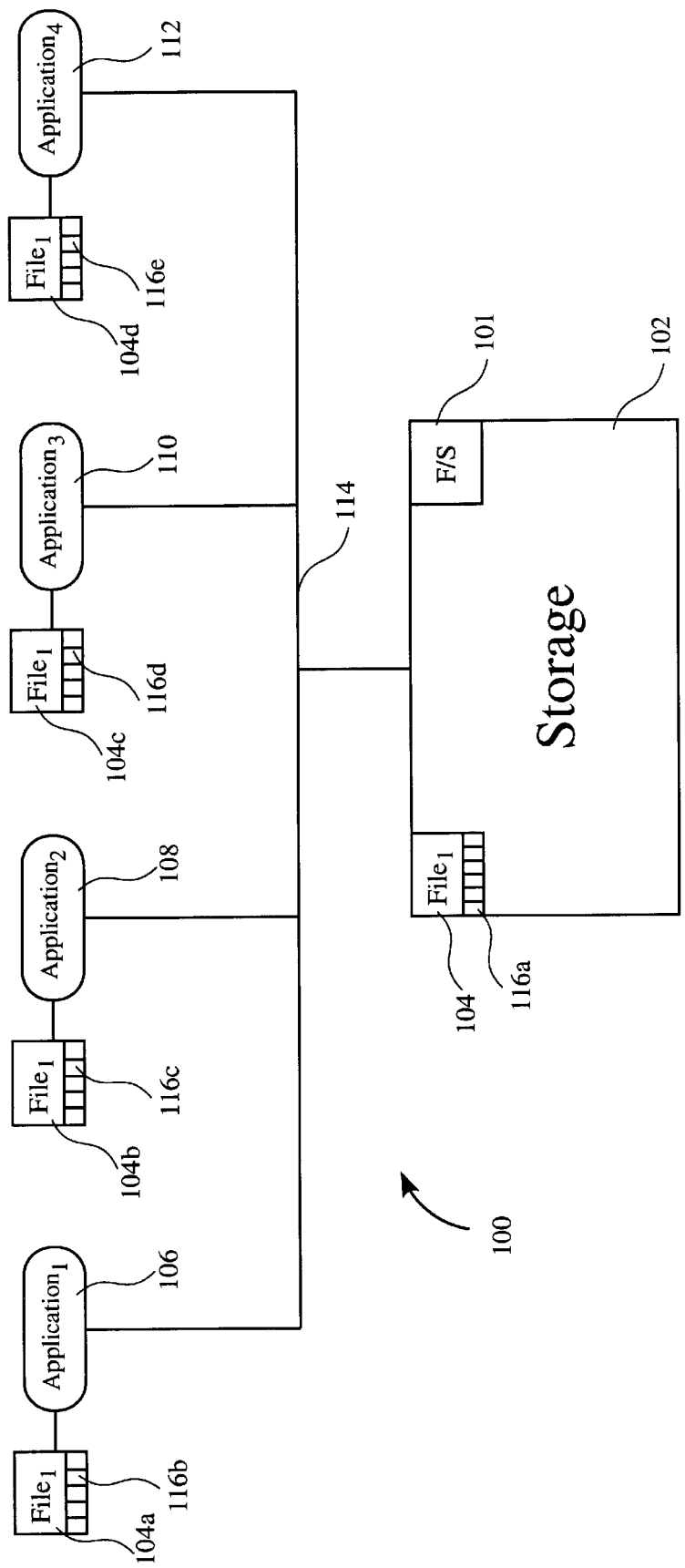
FIG. 1A illustrates a system having multiple applications using the same file, in accordance with one embodiment of the present invention.

Reference is now made to FIG. 1A which illustrates a system 100 having multiple applications, including application$_1$ 106 through application$_4$ 112. Each application, in this illustration is shown using the same file, e.g., file$_1$ 104 and 104a through 104d, in accordance with one embodiment of the present invention. A shared connection 114 facilitated by way of a switched fabric enables connection and communication between the application$_1$ 106, the application$_2$ 108, the application$_3$ 110 and the application$_4$ 112 with storage 102. The shared connection 114 can also be a bus that enables shared processing by an application. In one embodiment, the storage 102 may be any type of storage system that enables shared access, such as a server having associated storage drives. The use of "server" should be broadly construed to include any processing device that facilitates network communication to storage and users of connected processing machines (which may be local, remote, physically connected, or using wireless technology). The drives may include simple hard disks or more complex configurations, such as those implementing a redundant array of inexpensive discs (RAID), storage area networks (SANs), and the like.

Also shown with respect to FIG. 1A are the files, e.g., file$_1$ 104 through 104d. The original file$_1$ 104 is preferably stored in the storage 102. The files 104a through the file$_1$ 104d are copies of the file$_1$ 104 stored on the storage 102. Thus, the application$_1$ 106 through the application$_4$ 112 use the same data which is stored in file$_1$ 104a through file$_1$ 104d. The application 106 through application 112 may be any type of application, such as a word processor, a database program, a spreadsheet program, a calendar program, an enterprise resource planning (ERP) system, etc. Also shown with respect to FIG. 1A is a file system 101 that tracks various functions of the files 104 through 104d such as what attributes are accessible by particular users, the location of files within the system 100, and the like. The file system 101, in one embodiment, may be part of or associated with an operating system that manages the storage 102. In addition, the file system 101 can be any file system. Examples are NTFS, FAT, etc.

In a preferred aspect of the present invention, the files 104 through 104d contain bitmaps 116a through 116e. The bitmaps 116a through 116e contain bits that reflect actions which can be performed on the files 104 through 104d, as will be further discussed with reference to FIGS. 1C through 1G. The file consistency protocol is thus designed to ensure that data associated with each copy of the files 104 through 104d, including the original file 104, remains consistent. The file consistency protocol also ensures that attributes for the files 104 through 104d remain consistent.

FIG. 1B is a table 118 illustrating the various functions of a file consistency protocol in accordance with one embodiment of the present invention. The file consistency protocol includes "M", "A", "E", "S" and "I" on a bit map of the files 104 through 104d, as will be discussed further with reference to FIGS. 1C through 1G.

List Action

Among the actions that may be performed on the copies of the file is a "List" action, as shown on table 118. When a user desires to list (e.g. using 1s or 1f or a comparable function) properties of a file (i.e., file size, access permissions, owner, etc.), a change is not made to a file. Thus, the "M", "A", "E", "S" and "I" bits remain unchanged. This is because the attributes of a file may be read without performing an open of the file itself.

Open Shared Action

Another action a user may perform on the file is an "Open Shared" to place the file in an open, shared mode. This is especially common practice if a file is to only be read. In the open shared mode, a user opens a file, such as the $file_1$ 104, and other users are able to simultaneously open copies of the file, such as files 104a through 104d while the user has the $file_1$ 104 open. In this instance, the "S" bit is (which represents the shared mode) set on the file accessed by the user and all other copies of that file. No changes to other copies of this file are required. When the user closes the file, the "S" bit in the file and the multiple copies is reset. Although, if other instances were open in the open shared mode, the "S" bit will remain set until all instances having the "S" bit set are closed.

Open Exclusive Action

When a user desires to execute an "Open Exclusive" action to set an open exclusive mode, the "E" bit is set on all copies including the one desiring to set the open exclusive mode. Initially, a determination is made to ascertain whether any one of the "M", "A", "E", "S" and "I" bits is set on another instance of the file. That is, if any instance has one of the consistency bits set to "1" (i.e., true), then the user desiring to set the open exclusive mode will fail. However, if no other instances have one or more of their consistency bits set to "1", then the user will be able to open the file in the open exclusive mode. When the "E" bit is set, all instances of the file will fail an "open," except for the one that set the "E" bit. Furthermore, any attempts to open the file by other consumers (e.g., users on a computing device) will also fail, which includes preventing all others from making independent copies of the file. The only operation that may be performed on a file that has its "E" bit set to "1" is a LIST of that file. The list operation allows only file attributes to be read. It must be noted, however, that the information obtained from the list operation may later be invalid, as it is possible to exclusively open a file and for the user or application performing the exclusive open to alter the attributes of the file thus making one or more of its attributes invalid (e.g. to render an executable file non-executable). Upon the close of the file the having its "E" bit set, that "E" bit shall be reset to zero "0." In addition, the initiating file will also have its "M" bit set to 1 (if it was written) and all copies/instances of that file will have their "I" bit set to "1" and shall be updated to match that of the copy which had had its "E" bit set. When all updates have occurred, the "M" and all relevant "I" bits are reset to "0." During an open, if the attributes are changed, the protocol will call for the "A" and "I" bits to be set for all other instances, as will be described in greater detail below.

Write Action

When a user desires to write to a file or perform another modification on the file that is opened shared, the user may execute a "write" action. The "M" bit is used when data in the file is modified in any manner. Thus, as data is written to the file, the "I" bit in copies of the file is set to indicate that the data contained in the copies is now invalid. This occurs since the data contained in the copies does not include the modifications made to the initiating file. Thus, all other copies must be updated to match the file with the "M" bit set. Once this has occurred, the "M" and "I" bits in all affected files must be set back to false (e.g., zero), indicating that consistency has been attained. In one embodiment, the data in the copies is updated by the application, file system, or operating system acting upon the copies "pulling" the modification from the modified file. In another embodiment, the copies are updated by "pushing" the modification(s) to any affected copies having the "I" bits. In still another embodiment, the pulling and pushing operations can be performed using a messaging technique in order to reduce communication overhead.

Change Attributes Action

A user may also change the attributes of a file with a "Change Attributes" action. Exemplary attributes can include name, owner information, access permissions, location of the file, the size of the file, time stamps, as well as other writable attribute parameters. As the user changes the attributes of the file, the "A" bit and the "M" bit is sent on the initiating file, and the "A" bit and the "I" bit is set on all other instances. This ensures that all other instances are made aware that the attributes are now invalid. As soon as other files are updated with the attribute changes, the "A" and "M" bits are reset on the initiating file, and the "A" and "I" bits are reset on all updated instances of the file. At that time, all other instances and the initiating file will have consistent attributes. In one embodiment, the instance copies are updated when the copies "pull" the attribute changes from the initiating file. In another embodiment, the instance copies are updated when the initiating file "pushes" the attribute changes to the instance copies.

Close Action

A "Close" action, which closes the file opened by the user, is also shown with respect to the table 118 of FIG. 1B. When a user completes one of the aforementioned actions, the file in use can then be closed. In some cases, the "close" action may have an implicit "write" performed (or not). The close action is completed when all the bits that were set (i.e., the "S" bit in the open shared mode) are reset, as will be discussed further with respect to FIGS. 1C through 1G.

Exemplary Application of MAESI Consistency Bits

FIGS. 1C through 1G show the bit maps 116a through 116e (the bit maps 116) in accordance with one embodiment of the present invention. The bit maps 116 correspond to the files 104 through 104d. The bit maps 116 contain the bits "M", "A", "E", "S" and "I" as previously described. The "M", "A", "E", "S" and "I" bits define an aspect of the file consistency protocol which is charged with maintaining the consistency of the contents in the files 104 through 104d. The "M", "A", "E", "S" and "I" bits have bit values which may be changed when various functions are performed on the files 104 through 104d. As used herein, the a value of "1" is analogous to "true" and a value of "0" is analogous to "false." Accordingly, "1" and "true" and "0" and "false" should be read as interchangeable definitions for the same condition.

In one embodiment, as the contents of the file 104b (marked by "*") are modified, a bit value for the "M" bit in the bit map 116c is changed from a "0" to a "1" (i.e., a first state to a second state). When the change in the bit value for the "M" bit is made, the modification is broadcasted to the files 104, 104a, 104c and 104d. As the notification of modification is made, a bit value for the "I" bit in the bit maps 116a, 116b, 116d and 116e is changed from a "0" to a "1" as shown in Line 1 (L1). In order to reset the bit values back to "0" in the bit maps 116a through 116e, the contents of the files 104 104a, 104c and 104d must be updated with the modification made to the file 104b.

In one embodiment, the files 104, 104a, 104c and 104d "pull" the modified contents of the file 104b, thereby updating the files 104, 104a, 104c and 104d. In another embodiment, the modified contents of the file 104b are "pushed" to the files 104, 104a, 104c and 104d. Once the contents of the files 104, 104a, 104c and 104d are updated with the modified contents of the file 104b, the bit value for the "I" bit in bit maps 116a, 116b, 116d and 116e are reset to "0" and the bit value for the "M" bit in the bit map 116c is reset to a "0", as shown in Line 2 (L2) of FIGS. 1C through 1G.

The "A" bit represents the attributes of the files 104 and 104a through 104d as described earlier. As the attributes of the file 104a (marked by "*") are changed, bit values for the "A" bit and the "M" bit are set from a "0" to a "1" in the bit map 116b as shown in Line 3 (L3) of FIG. 1D. When the attributes of the file 104a are changed, bit values for the "A" bit and the "I" bit are set from a "0" to a "1" in the bit maps 116a, 116c, 116d and 116e. The "M" bit is set in the bit map 116b because the attributes of the file 104a were modified. The "I" bit is set in the bit maps 116a, 116c, 116d, and 116e because the files 104, 104b, 104c and 104d now have invalid attributes due to the attribute change in the file 104a. The bit values for the "M" bits, the "A" bits and the "I" bits remain "1" until the attribute change made to the file 104a is made to the files 104 and 104b through 104d. In one embodiment, it is preferred that only the attribute change portion of the file is sent. Thus, the entire file need not be sent to the other instances, which minimizes overhead, such as network traffic, on the system 100. Once the attribute changes are received by the other instances, the bits are reset to "0" as shown in Line 4 (L4).

"E" bit represents the open exclusive open mode, as described earlier. As such, when the "E" bit is desired to be set by the 104d (marked by "*") in Line 5 (L5) in the system 100 of FIG. 1A, a check is first made to determine whether other open instances have one of the "M", "A", "E", "S" or "I" bits set. If any of these bits are set, then the user is not able to set an open exclusive. An open exclusive can be set by the user of file 104d because none of the bits are set in Line 4 (L4). If any one of the bits were set in L4, then the exclusive open would fail. When the open exclusive is set by the user of file 104d, the "E" bit is set on all instances of the file including the file that initiated the open exclusive. By doing this, all other instances are prevented from accessing the file, thus placing the file in a "locked" state. Although the user that set the open exclusive will still be able to use the file without worry that another user will make changes to either the data contents or the attributes. This is because the bits are preferably checked at "open," not during use. Of course, other embodiments can include checks during use. Once the user has closed the file, the "E" bits are removed from the current file as well as all other instances. If there were any changes to the file 104d during the open exclusive mode use, then the file 104d will have its "M" bit set as shown in Line 6 (L6). All other instances will have their "I" bit set. This condition will therefore remain until the modification made at file instance 104d is inherited by the other instances. Once the other instances have integrated the modifications (using a pull or push technique), the "M" and "I" bits are reset to "0" as shown in Line 7 (L7) of FIGS. 1C through 1G. If the file 104c (marked by "*") is opened in the open shared mode, the "S" bit in the bit map 116d for the file 104c is set from a "0" to a "1" and the "S" bit in the bit maps 116a, 116b, 116c and 116e will also be set from a "0" to a "1", which is shown on Line 8 (L8). Thus the file consistency protocol enables the sharing of files by setting the "S" bit in all copies of the file.

FIG. 1H shows a file 104 having an attributes field 124 and a data portion 122. This diagram is provided to illustrate that files have both attribute characteristics as well as data, which need not be adjacent. That is, both the data portion 122 and the attributes field 124 can be arranged separately (e.g., in a list, a table, a data structure, as part of another file, etc.) and associated with when accessed, for example. The consistency protocol is designed to ensure that changes to shared copies of a file, whether the change is to the attributes or the data, remain consistent. As described with reference to FIGS. 1C through 1G, the "M", "A", "E", "S" and "I" bits relate to various properties and attributes of the file copies 104 through 104d. As shown with respect to FIG. 1H, the "M" bit, the "A" bit and the "I" bit relate to file attributes 124. Also shown with respect to FIG. 1H, the "M" bit, the "E" bit, the "S" bit and the "I" bit relate to data 122 of the file. Thus, as previously explained, when one of the files 104 through 104d is opened or data is modified in the files 104 through 104d, the "M" bit, the "E" bit, the "S" bit and the "I" bit are set for the data 122 depending on the action.

Figure 2A:
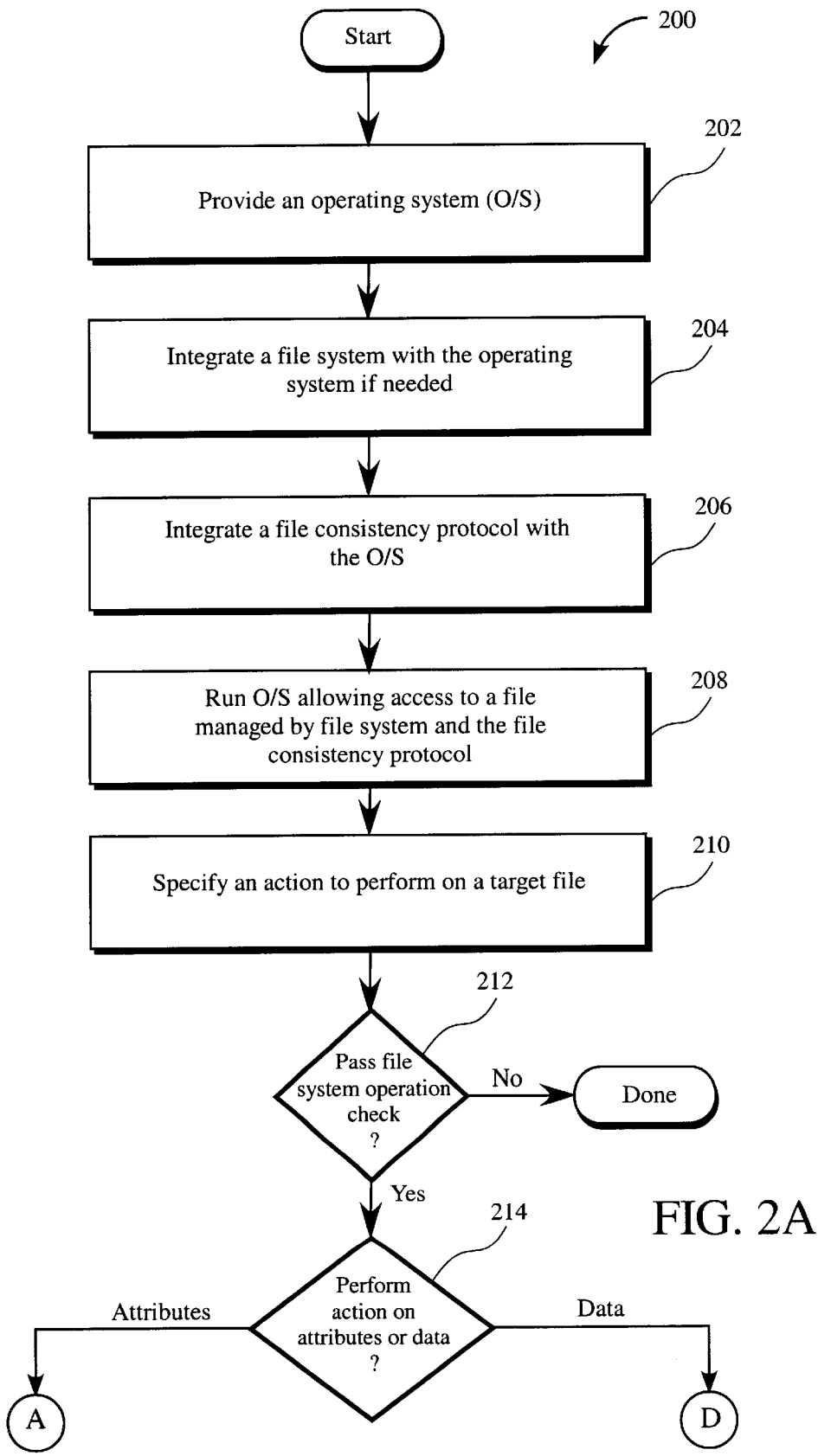
FIG. 2A is a flowchart illustrating a method for maintaining file consistency of shared files associated with a file system, in accordance with one embodiment of the present invention.

FIG. 2A is a flowchart diagram illustrating a method 200, in accordance with one embodiment of the invention. In operation 202, an operating system capable of managing programs, such as Windows NT™, UNIX™, Solaris™, or any other type of operating system, is provided. In one embodiment, once the operating system is provided, a file system is integrated with the operating system in operation 204. In an alternative embodiment, the file system need not be integrated with the operating system (e.g., the file system can be a "loadable file system"). For instance, the operating system can simply be associated (or in communication) with a file system that is either executed at the operating system level or at a driver level (e.g., ring 0 level). In an example where a file system is integrated with an operating system, the operating system is preferably installed in the storage associated with the system 100 of FIG. 1A. As mentioned above, the file system 101 is charged with managing files, such as the file$_1$ 104. As is well known, the file system 101 is charged with managing information of files, directories, mapping of data stored on storage discs, the size of files, and other well known file system tasks. Once the file system 101 is integrated with the operating system in operation 204, an operation 206 is performed.

In operation 206, a file consistency protocol is integrated with the desired operating system. As mentioned above, the file consistency protocol is charged with maintaining file consistency among copies of files being managed by the file system that was integrated with the operating system. Again, it should be clear that the file system need not be integrated with the operating system and the file consistency protocol need not be integrated with the operating system. In a preferred embodiment, however, it is a desire to have the file system, the operating system and the file consistency protocol in communication with one another. For instance, each component can be a module, a driver, or an application component that interfaces with each other to provide efficient functional interfacing.

Accordingly, when data is modified in one of the files, the file consistency protocol ensures that all copies of the file associated with the file system are updated to reflect to the modification made to the file. Referring back to the example and FIG. 1B, the file consistency protocol using the "M", "A", "E", "S" and "I" bits is integrated with the file system. As previously described, the "M", "A", "E", "S" and "I" bits ensure file consistency is maintained among various copies of files. After the "M", "A", "E", "S" and "I" bit file protocol is integrated, connected, or associated with the operating system, operation 208 is performed.

In operation 208, the operating system is run to enable access to a file managed by the file system and the file consistency protocol. Turning back to the example, as the operating system of the system 100 is operating, a user can specify an action to perform on a target file. As described earlier with reference to the table 118 and FIG. 1B, among the actions the user may perform on the target file are, listing a file or a directory, opening a file in either an open shared mode or an open exclusive mode, write to a file, change the attributes of the file, and other desired actions. In one embodiment, the user may determine which file to target by first listing files associated with the file system prior to selecting a target file. Referring back to the example and FIG. 1A, a user may want to determine what files are on the system 100 by first listing the files being managed by the file system. After the file directory is listed, a user using application 108 may selects the file $file_1$ 104 as the target file. The copy of the file will therefore be $file_1$ 104a. In this example, the user may desired to perform an action on the attributes of the copy $file_1$ 104a.

Once the user specifies an action to perform on the target file in operation 210, in one embodiment a file system check may be performed in operation 212. The file system 101 of the example determines whether or not the user requesting the action has permission to execute the requested action. In one embodiment, a system administrator can input into the file system 101 of the system 100 which users are able to access particular files and what information the different users are able to access. Therefore, the file system 101 or associated logic or components determines if the user is able to read the file. If it is determined that the user does not have permission to read the file, the operation requested is rejected. On the other hand, if it is determined that the user does have permission to read the file, the method 200 moves to operation 214. Referring back to the example and FIG. 1A, the file system 101 may determine that the user is able to access the $file_1$ 104.

Figure 2B:
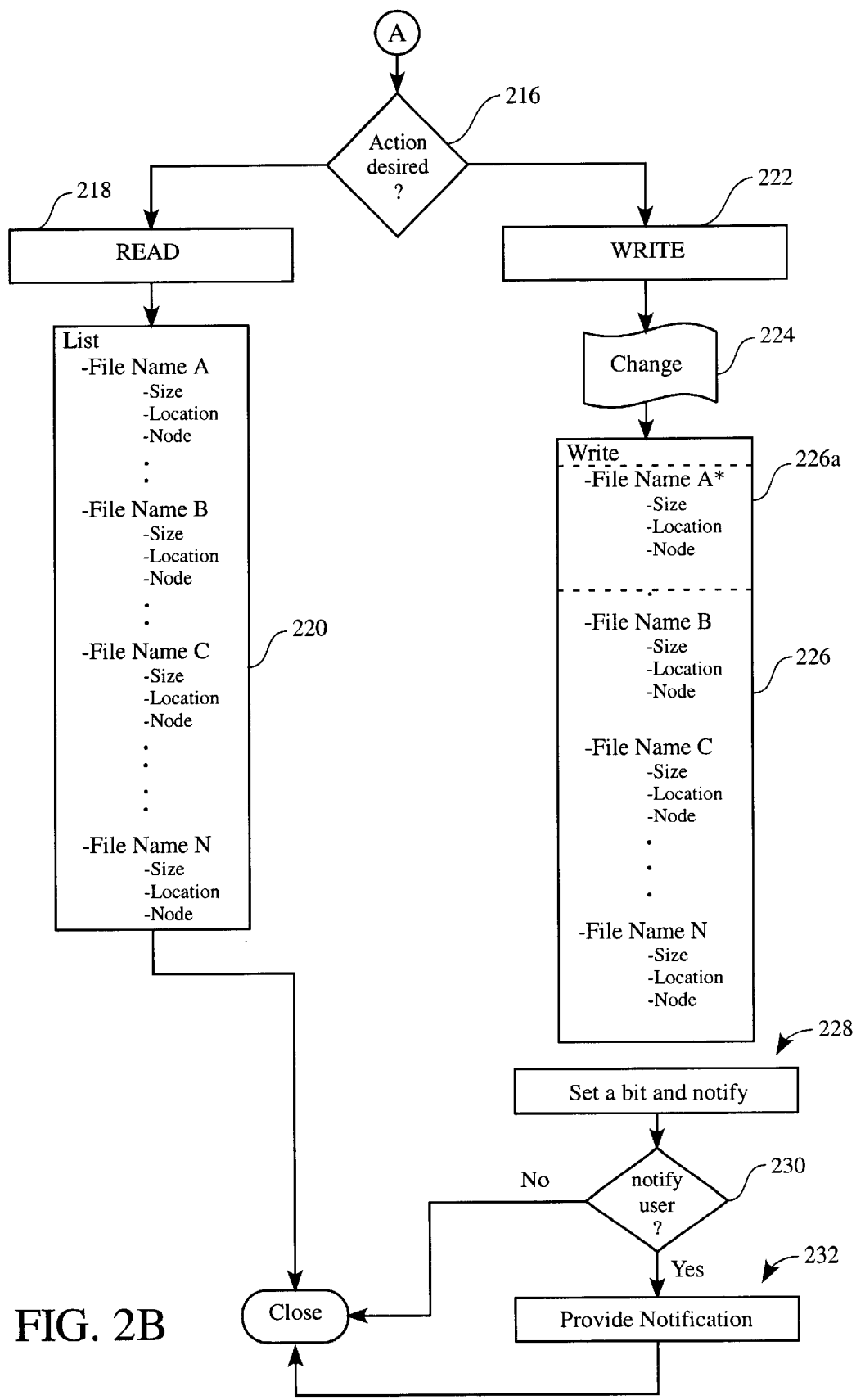
FIG. 2B shows a flowchart for a method for maintaining file consistency of shared files associated with a file system, in accordance with one embodiment of the present invention.

In operation 214, a determination is made to ascertain whether the specified action is to be performed on attributes of the target file or on data of the target file or both. If the action is to be performed on the attributes of the target file, operation 216 is performed in A as shown in FIG. 2B. On the other hand, if the action is to be performed on data in the target file, the method will move to D and operation 234 (as will be discussed further with respect to FIG. 2C). If a data piece is accessed, at least one attribute will change (e.g., data stamp of a most recent access).

In the case where the action to be performed is an attribute action, a determination will be made as to whether a read 218 or a write 222 is to be performed in operation 216. Thus, if a list action is specified by the user, the read 218 is performed. If a write action is specified, the write operation 222 is performed. In the operation 218, the method 200 may also make a determination as to whether the request is from a trusted kernel process, such as a second file system (not shown). If the method 200 determines that the user is not a trusted kernel process, the method 200 may then ascertain what attributes the user may read and lists only those attributes 220. As previously mentioned, a system administrator, or the like, can set the user access information beforehand and the file system 101 can determine what information a particular user may read based on the user access information. If the user is only allowed to read the name of the file, size of the file, the location of the file and the node information of the file but not access permissions of the file, only the size, location and node information of the file are listed, for example as shown with respect to FIG. 2B. Thus, if the user requests to see information the user does not have permission to see, such as ownership attributes, that information will not be listed. After the file attributes are listed in the operation 220, the target file is closed.

If a write action is specified by the user, the operation 222 is performed. As described with reference to the operation 218, the operation 222 ascertains what attributes the user may access and allows the user to write changes only to those attributes the user may access in operation 224. Turning back to the example, the user may desire to change the access privileges of the file, the size, the location or the node information of the file name A, as represented by attributes 226a with respect to FIG. 2B. In this example, the user only has access to the size, the location and the node information of the copy file, 104a (as mentioned above, the user in this example is accessing the file 104 by way of application 106). During the change operation 224, the user may change the size, location or node information for the files, as shown in file attributes 226. However, the user cannot change the access privileges of the file because the user does not have access to the access privilege information of the target file. When the user has changed the file attributes, the "A" bit is set in the target file and the attribute changes are broadcast to any entity having an instantiation of the consistency protocol in operation 228. That is, the notification will be made to all other open copies.

After the attribute change notification is provided to the file copies 104, 104b, 104c and 104d in operation 228, the method 200 determines in an operation 230 if a user using a copy of the target file is to be notified. If the method determines that the user of a copy of the target file is not to be notified, the user is not notified and the file copies 104, 104b, 104c and 104d "pull" the attribute change(s) from the file 104a at a set time or on demand. Once the file copies 104, 104b, 104c and 104d have pulled the change in this example, the "A" bit in the $file_1$ 104 through 104d and the "M" and "I" bits in the files $file_1$ 104, 104b, 104c and 104d are reset to "0" (false) as shown in Line 4 (L4) with reference to FIGS. 1C though 1G.

If the method determines that the user of a copy of the target file is to be notified, then the user is notified of the attribute change in operation 232. The user may be notified in operation 232 through any number of ways, including a graphical user interface (GUI), a sound generated by a sound driver of the user's computer, in the form of highlighted changes, in the form of icons presented in the task bar, in the form of a report that can be accessed at a later time, or any other method that enables the user to be informed that change have been made to the file by another user. Of course, the notification may also include information as to what the changes were so that another user may accept or deny such changes if desired. If the changes are not acceptable, that user may want to rename the copy so that the changes are not made to the file.

Figure 2C:
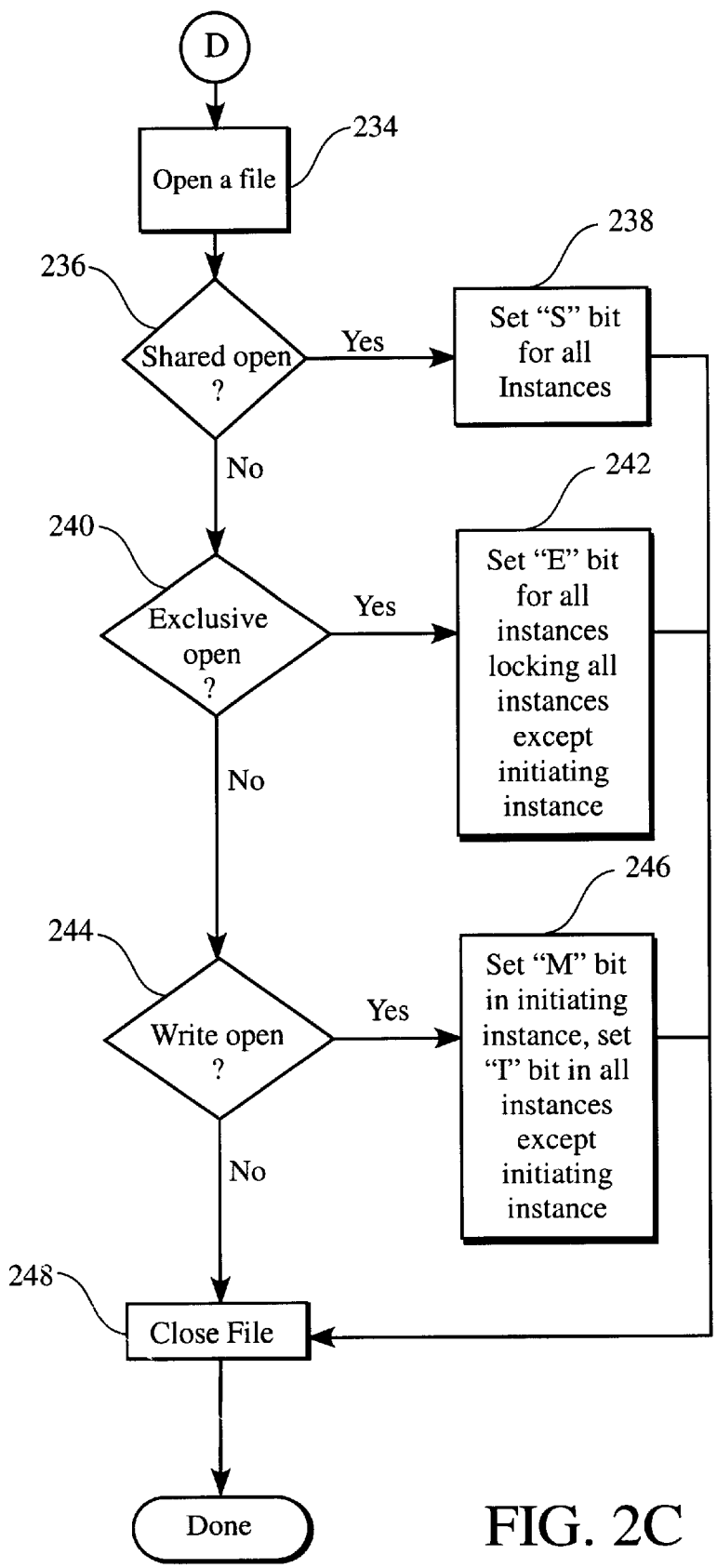
FIG. 2C is a flowchart illustrating a method for maintaining file consistency of shared files associated with a file system, in accordance with one embodiment of the present invention.

Turning back to the operation 214, if the method 200 determines that the action specified by the user in the operation 210 is to be performed on data of the target file, the operation 234 is performed from D, as shown with respect to FIG. 2C. In the operation 234, the target file is opened and an operation 236 is performed. For example, a user in operation 210 may specify a write action on data in the file 104.

In the operation 236, the method 200 determines if the user has specified an open shared mode. If the user specifies the open shared mode in operation 210 of FIG. 2A, the operation 238 is performed, where the "S" bit is set for each instance. As previously described, the open shared mode allows additional users working with copies of the target file access to the copies of the target file as the user is working with data on the target file. Also, when the open shared mode is requested, the "S" bit in the target file and the copies of the target file are set, as described earlier. When the user completes working with the target file in the open shared mode, the file is closed and the "S" bits are reset in all instances and the target file is closed in an operation 248. In another embodiment, if the target file is closed without a write, the "S" bits in the target file and the copies of the target file are automatically reset when the target file is closed. In still another embodiment, if the other instances were also opened in the open shared mode, the "S" bits will remain set until those instances are closed. If the method 200 determines in operation 236 that an open shared mode was not specified in operation 210, then the method 200 will proceed to operation 240.

In operation 240, the method 200 determines if an open exclusive mode was specified in operation 210. If the user specifies an open exclusive mode, the "E" bit is set in each file, including the instance that set the file. As previously described, the open exclusive mode allows the user to lock out others from opening copies of the target file while the user is working with the target file. Thus, the "E" bit is set in all copies of the target file in order to prevent another user from accessing the file while the user has the target file opened. When the user completes working with the target file in the open exclusive mode, the target file is closed in the operation 248. Also, the "E" bits are reset in the copies of the target file and any modifications made to the target file are either pushed to the copies of target file or pulled by the copies of the target file from the target file as previously discussed. As used herein, when it is said the a "file copy pulls" or a "file copy pushes" modifications or attribute changes, the understanding is that the file consistency protocol running on each of the systems will cooperate in accordance with the bits of the bit maps 116 to cause the appropriate action to take place using the appropriate processing and communication means (e.g., such as message communication). In another embodiment, if the target file is closed without a write, the "E" bits in the copies of the target file are automatically reset when the target file is closed in operation 248. Turning back to the example, if the method 200 determines that an open exclusive was not specified in the operation 210, then an operation 244 is performed. If more than one open exclusive succeeds, then race resolution is done at write time.

In operation 244, the method 200 determines if a write was specified in operation 210. If a write action was not specified in the operation 210, the method 200 moves to the operation 248 where the file is closed. If a write was specified, an operation 246 is performed where the "M" bit is set in the target file and the "I" bit is set in all copies of the target file. In one embodiment, if a write was specified, the "M" bit is set in the target file and the modification to the target file is made to the copies of the target file, thereby resetting the "I" bit of the copies. In another embodiment, the copies of the target file periodically check the status of the "M" bit and set the "I" bit if the copies find the "M" bit set during a periodic check.

It should be noted that the exemplary process of determining whether shared open, exclusive open, and writes are to be performed need not occur in the order defined by FIG. 2C. For example, operations 236, 240, and 244 may be performed independently of one another depending upon the action taken on a particular file by a user. Therefore, it is not necessary proceed through decision operations 236 and 240 in order to operate on a write request. Thus, the flowchart of FIG. 2 were provided to illustrate one exemplary process for implementing the consistency protocol. Although, the consistency protocol can be coded to operate in any number of ways, which for example, enable processing of decisions in parallel by running multiple threads or the like.

As may be appreciated, the present invention allows a user to modify existing data of a target file while other users on the system access instances of the same file. Changes, modifications, or attribute changes made to one instance is then synchronized to other instances to maintain consistency between the copies. As compared to the prior art, a user can now access and make modifications to a shared file without having to make an independent renamed copy of a file. As noted, when new copies having different names are created, changes made by other users may not be known, and if known, the changes will have to be manually merged. In some cases, a user can use a compare program or function, but this also requires that the user know of the existence of other copies and make time consuming determinations as to whether changes should be incorporated.

The file consistency protocol also enables users of shared data (e.g., documents, database entries, etc.) to make intelligent decisions regarding use privileges, change management, and synchronization of such changes. Such change notifications, as mentioned above, are preferably performed using efficient message technology. The change notifications can also occur at different times and enabled by different protocols. In some cases, the changes can be made using "push" techniques and in others using "pull" techniques (or a combination thereof). In either case, the user of an instance can be given the option to make changes mandatory on other instances, restrict access to other instances, and set when changes are to be notified. In addition, when changes are notified, it is preferred that only the changes (data or attribute portion) be notified instead of the entire file. Of course, the changes can also be accomplished by sending the entire file and its attributes. Most powerfully, changes to files can be made on the fly to other instances without having to make independent copies that later complicate the integration of changes The present invention also has the added bonus of increased efficiency. When an attribute change is made, only that attribute change is sent to other instances without the need to message or send the entire file or all attributes. Thus, the file consistency protocol of the present invention does not encumber the system and network over which the files are accessed and shared. This efficiency, as mentioned above, also applies to changes made to data. The file consistency protocol thus reduces system/network overhead (e.g., CPU cycling times, user intervention, and network traffic).

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include cache memory, read-only memory, random-access memory, optical media, magnetic tapes, arrays of disks, distributed storage, networked storage, logical and physical storage implementations, redundant array of inexpensive disk (RAID) storage, and the like. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for maintaining file consistency, a file being associated with a file system, the method comprising:
   integrating a file consistency protocol with an operating system (O/S), wherein the file consistency protocol maintains file consistency between instances of the file associated with the file system using a set of consistency bits;
   checking the file for an exclusive bit setting of true;
   failing an opening of another instance of the file if the exclusive bit of the file was determined to be set to true;
   opening another instance of the file if the exclusive bit of the file was determined to be set to false;
   changing the file;
   setting a bit of the set of consistency bits on the instance file to reflect the change performed to the file, the change being made in accordance with the file consistency protocol that operates based on the settings of the set of consistency bits; and
   updating the instance file such that the instance file contains the change made to the file using the file consistency protocol.

2. A method for maintaining file consistency, a file being associated with a file system as recited in claim 1, the operation of updating the instance file further comprising:
   pushing the change to the instance file from the file.

3. A method for maintaining file consistency, a file being associated with a file system as recited in claim 1, wherein the instance file pulls the change from the file in order to update the instance file.

4. A method for maintaining file consistency, a file being associated with a file system as recited in claim 1, further comprising:
   determining a type of change to be performed on the file before the change to the file is performed.

5. A method for maintaining file consistency, a file being associated with a file system as recited in claim 4, wherein the type is a data change.

6. A method for maintaining file consistency, a file being associated with a file system as recited in claim 4, wherein the type is an attribute change.

7. A method for maintaining file consistency, a file being associated with a file system as recited in claim 1, wherein the set of consistency bits comprises an "M" bit, an "A" bit, an "E" bit, a "S" bit and an "I" bit.

8. A method for maintaining file consistency, a file being associated with a file system as recited in claim 7, wherein the "M" bit, the "A" bit, the "E" bit, the "S" bit and the "I" bit are set by changing the "M" bit, the "A" bit, the "E" bit, the "S" bit and the "I" bit from a first state to a second state and are reset back to the first state.

9. A method for maintaining file consistency, a file being associated with a file system as recited in claim 1, the method further comprising:
   closing the file and the instance file after all changes are made to the file and the instance file.

10. A method for maintaining file consistency, a file being associated with a file system as recited in claim 8, wherein the first state is a "0" state and the second state is a "1" state.

11. A method for maintaining file consistency, a file being associated with a file system as recited in claim 7, the method further comprising:
    setting a file bit in the set of consistency bits when the file is changed.

12. A method for maintaining file consistency, a file being associated with a file system as recited in claim 11, wherein the "M" bit is set in the file when the data in the file is modified such that the "M" bit is the file bit that is set in the set of consistency bits.

13. A method for maintaining file consistency, a file being associated with a file system as recited in claim 11, wherein the "I" bit is set in the instance file when data in the file is modified such that the "I" bit is the bit set in the set of consistency bits on the instance file.

14. A method for maintaining file consistency, a file being associated with a file system as recited in claim 11, wherein the "A" bit is set in the file and the instance file when the attributes of the file associated with the file system is modified, such that the "A" bit is the bit set in the set of consistency bits on the instance file and the "A" bit is the file bit set in the set of consistency bits on the file.

15. A method for maintaining file consistency, a file being associated with a file system as recited in claim 11, wherein the "E" bit is the bit set in the set of consistency bits on the instance file and the file when the instance file is opened exclusively, such that no other users may access the file while the instance file is opened exclusively.

16. A method for maintaining file consistency, a file being associated with a file system as recited in claim 11, wherein the "S" bit is the bit set in the instance file and the "S" bit is the file bit set in the file when the file is opened in a open shared mode.

17. A method for maintaining file consistency, a file being associated with a file system as recited in claim 16, wherein the open shared mode allows other users to access the instance file while the file is opened in the open shared mode.

18. A method for maintaining file consistency, a file being associated with a file system as recited in claim 6, the method further comprising:
   ascertaining if a list or a write is requested to attributes of the file; and
   determining what attributes a user may access.

19. A method for maintaining file consistency, a file being associated with a file system as recited in claim 18, wherein file attributes are listed when the list is requested.

20. A method for maintaining file consistency, a file being associated with a file system as recited in claim 18, wherein when the write is requested, the method further comprises:
   changing file attributes of the file and updating the instance file such that attributes of the instance file are consistent with the file attributes of the file.

21. A method for maintaining file consistency, a file being associated with a file system as recited in claim 1, wherein the file consistency protocol is configured to maintain consistent data in the file and the instance file, such that as data is modified in the file or the instance file, the modification to the data in the file or the instance file is made to data in the instance file or the file.

22. A method for maintaining file consistency, a file being associated with a file system as recited in claim 1, the method further comprising:
   communicating the change in the file to a processing entity having an instantiation of the file and the consistency protocol.

23. A method for maintaining file consistency, a file being associated with a file system as recited in claim 6, wherein changing the file attributes further comprises:
   listing the file attributes of the file without increasing protocol overhead.

24. A method for maintaining file consistency between multiple instances of a file, the method comprising:
   associating a file consistency protocol with an operating system (O/S), the file consistency protocol maintaining file consistency between multiple instances of the file associated with a file system using a set of file consistency protocol bits;
   checking the file for an exclusive bit setting of true;
   failing an opening of another instance of the file if the exclusive bit of the file was determined to be set to true;
   opening another instance of the file if the exclusive bit of the file was determined to be set to false;
   performing an action on the file to change the file;
   determining the type of action being performed on the file;
   if the another instance of the file is opened, setting a bit in the set of file consistency protocol bits in the another instance of the file such that the set bits reflect the action performed on the file; and
   messaging an update to the another instance of the file having the set bit such that the another instance of the file contains the change performed on the file.

25. A method for maintaining file consistency, a file being associated with a file system as recited in claim 24, wherein the determining the type of action further comprises:
   determining if data within the file is to be changed; and
   determining if attributes within the file are to be changed.

26. A method for maintaining file consistency, a file being associated with a file system as recited in claim 25, wherein the action further comprises:
   modifying data within the file.

27. A method for maintaining file consistency, a file being associated with a file system as recited in claim 25, wherein the action further comprises:
   listing attributes of the file.

28. A method for maintaining file consistency, a file being associated with a file system as recited in claim 24, wherein the action comprises:
   opening the file in an open exclusive mode if it is determined that no other instance of the file has any of its set of file consistency bits set to "1".

29. A method for maintaining file consistency, a file being associated with a file system as recited in claim 24, wherein the action further comprises:
   opening the file in an open shared mode.

30. A method for maintaining file consistency, a file being associated with a file system as recited in claim 27, wherein the action further comprises:
   changing attributes of the file.

31. A method for maintaining file consistency, a file being associated with a file system as recited in claim 30, wherein the action further comprises:
   closing the file after making the attribute changes, if changes were made when the file was open.

32. A method for maintaining file consistency, a file being associated with a file system as recited in claim 24, wherein the set of file consistency protocol bits comprises:
   a "M" bit, an "A" bit, an "E" bit, a "S" bit and an "I" bit.

33. A method for maintaining file consistency, a file being associated with a file system as recited in claim 32, wherein the "M" bit is set in the file when the data is modified in the file, and the "I" bit is set in the multiple instances.

34. A method for maintaining file consistency, a file being associated with a file system as recited in claim 32, wherein the "A" bit is set for the file and the multiple instances of the file when the attributes of the file are changed.

35. A method for maintaining file consistency, a file being associated with a file system as recited in claim 32, wherein the "E" bit is set in the file and the multiple instances of the file when the file is opened in the open exclusive mode, wherein none of the multiple instances of the file are able to have further access to data or attributes except for the file that set the "E" bit.

36. A method for maintaining file consistency, a file being associated with a file system as recited in claim 32, wherein the "I" bit is set in the multiple instances of the file when the data is modified in the file.

37. A method for maintaining file consistency, a file being associated with a file system as recited in claim 32, wherein the "S" bit is set in the file and the multiple instances of the file when the file is opened in the open shared mode.

38. A method for maintaining file consistency, a file being associated with a file system as recited in claim 32, wherein the "I" bit is set in the multiple instances of the file when the attributes of the file are changed.

39. A method for maintaining file consistency, a file being associated with a file system as recited in claim 32, wherein the "M" bit is set in the multiple instances of the file when the attributes of the file are changed.

40. A file consistency process for maintaining file consistency of files managed by a file system, the file consistency process being associated with an operating system, the file consistency process including:

a set of file consistency bits which correspond to actions performed on a file managed by the file system, the set of file consistency bits being configured to be set when one of the actions is to be performed on the file, the set of file consistency bits including an exclusive bit, wherein the exclusive bit being set to true causes an opening of another instance of the file to fail;

a plurality of instances of the file being instantiated when the exclusive bit of the file is set to false, the set of file consistency bits being set for each of the plurality of instances of the file so as to cause each of the instances to be updated when the actions change the file.

41. A file consistency process for maintaining file consistency of files managed by a file system as recited in claim 40, the set of file consistency bits comprising:

a "M" bit, an "A" bit, an "E" bit, a "S" bit and an "I" bit.

42. A file consistency process for maintaining file consistency of files managed by a file system as recited in claim 40, wherein the actions comprise:

listing attributes of the file;

opening the file in an open shared mode;

opening the file in an open exclusive mode; and closing the file.

43. A file consistency process for maintaining file consistency of files managed by a file system as recited in claim 40, wherein the actions that change the file further comprise:

modifying data in the file; and changing attributes in the file.

44. A method for maintaining consistent file data for shared files, comprising:

defining a set of consistency bits, wherein the set of consistency bits includes an exclusive bit;

checking a file for an exclusive bit setting of true;

failing an opening of another instance of the file if the exclusive bit of the file was determined to be set to true;

opening another instance of the file if the exclusive bit of the file was determined to be set to false;

changing the file;

setting a bit of the set of consistency bits on the instance file to reflect the change performed to the file; and communicating an update to the instance file such that the instance file contains the change made to the file.

45. A method for maintaining file consistency between multiple copies of a file, the method comprising:

integrating a set of file consistency protocol bits with a file system that manages the file and the multiple copies of the file;

checking the multiple copies of the file for an exclusive bit setting of true;

failing an opening of the file if the exclusive bit of at least one of the multiple copies of the file was determined to be set to true;

opening the file if the exclusive bit of each of the multiple copies of the file was determined to be set to false;

performing an action on the file to change the file;

setting a bit of the set of file consistency protocol bits in the multiple copies of the file such that the set bits reflect the action performed on the file; and messaging an update to the multiple copies of the file having the set bit such that the multiple copies of the file contain the change performed on the file.

* * * * *